United States Patent [19]
Fitzgerald et al.

[11] Patent Number: 5,765,112
[45] Date of Patent: Jun. 9, 1998

[54] LOW COST WIDE AREA NETWORK FOR DATA COMMUNICATION USING OUTBOUND MESSAGE SPECIFYING INBOUND MESSAGE TIME AND FREQUENCY

[75] Inventors: Brendan T. Fitzgerald, Indialantic; Andrew T. Powshok, Indian Harbour Beach, both of Fla.; Donald K. Belcher, Rogersville, Tenn.; Jeffrey R. White, Melbourne Village, Fla.; Albert D. Darby, Jr., Valkaria, Fla.; Rodney Nelson, Merritt Island, Fla.

[73] Assignee: Flash Comm. Inc., Melbourne, Fla.

[21] Appl. No.: 468,004

[22] Filed: Jun. 6, 1995

[51] Int. Cl.$^6$ ................................. H04B 7/00
[52] U.S. Cl. .................... 455/509; 455/513; 455/38.1; 455/63
[58] Field of Search ...................... 455/33.1, 34.1, 455/38.1, 54.1, 54.2, 56.1, 62, 63; 379/57, 58, 59; 340/825.44

[56] References Cited

U.S. PATENT DOCUMENTS

| | | |
|---|---|---|
| Re. 25,834 | 8/1965 | Gelzer et al. . |
| 3,179,907 | 4/1965 | Brand et al. . |
| 3,183,464 | 5/1965 | Takahata et al. . |
| 3,475,703 | 10/1969 | Kennedy et al. . |
| 3,477,299 | 11/1969 | Speer et al. . |
| 3,510,808 | 5/1970 | Baker . |
| 3,688,048 | 8/1972 | Clark . |
| 3,702,958 | 11/1972 | Reynolds ............... 361/298.5 |
| 3,723,882 | 3/1973 | Carlson . |
| 3,914,715 | 10/1975 | Hubing et al. . |
| 3,956,701 | 5/1976 | James, Jr. et al. . |
| 4,025,882 | 5/1977 | Takeo . |
| 4,050,050 | 9/1977 | Nakanishi et al. . |
| 4,052,675 | 10/1977 | Valdettaro . |
| 4,063,229 | 12/1977 | Welsh et al. . |
| 4,083,003 | 4/1978 | Haemmig . |
| 4,107,689 | 8/1978 | Jellinek . |
| 4,123,754 | 10/1978 | Armstrong . |
| 4,129,749 | 12/1978 | Goldman . |
| 4,185,287 | 1/1980 | Hubing et al. . |
| 4,207,522 | 6/1980 | Thornton et al. . |
| 4,234,960 | 11/1980 | Spilsbury et al. . |
| 4,263,674 | 4/1981 | Morii et al. . |
| 4,320,400 | 3/1982 | Chasek . |
| 4,360,927 | 11/1982 | Bowen et al. . |
| 4,363,134 | 12/1982 | Murata et al. . |
| 4,409,687 | 10/1983 | Berti et al. . |
| 4,491,978 | 1/1985 | Nagata et al. . |
| 4,523,184 | 6/1985 | Abel . |
| 4,531,232 | 7/1985 | Sakurai . |
| 4,541,119 | 9/1985 | Cooper et al. . |
| 4,584,709 | 4/1986 | Kneisel et al. . |

(List continued on next page.)

FOREIGN PATENT DOCUMENTS

| | | |
|---|---|---|
| 8500482 | 1/1985 | WIPO . |
| 9408361 | 4/1994 | WIPO . |
| 9419873 | 9/1994 | WIPO . |

*Primary Examiner*—Edward F. Urban
*Attorney, Agent, or Firm*—Hamilton, Brook, Smith & Reynolds, P.C.

[57] ABSTRACT

A two-way communications system that provides ubiquitous wireless data communication services, such as throughout the continental United States, by using a network of only a few, widely distributed radio base station (RBS) sites and the existing paging network infrastructure. The paging network infrastructure is used as an outbound link to request data from the remote field units. The outbound page message indicates a time and frequency at which the RBSs can expect to receive data from the field units. A network hub or message operations center (MOC) coordinates the operation of the paging systems and RBSs from a central location. For example, the MOC determines an available HF frequency and time for a particular field unit to transmit, and then issues the request for data to the field unit using the existing paging network infrastructure. The field units make use of paging receivers, and an HF transmitter to report remote data such as a geoposition or other sensor data when requested to do so.

26 Claims, 5 Drawing Sheets

U.S. PATENT DOCUMENTS

| | | |
|---|---|---|
| 4,608,559 | 8/1986 | Friedman et al. . |
| 4,608,712 | 8/1986 | Fedde . |
| 4,617,831 | 10/1986 | Ohashi et al. . |
| 4,625,212 | 11/1986 | Oda et al. . |
| 4,628,152 | 12/1986 | Akerberg . |
| 4,644,351 | 2/1987 | Zabarsky et al. . |
| 4,644,561 | 2/1987 | Paneth et al. . |
| 4,665,401 | 5/1987 | Garrard et al. . |
| 4,682,367 | 7/1987 | Childress et al. . |
| 4,712,112 | 12/1987 | Carr . |
| 4,740,792 | 4/1988 | Sagey et al. . |
| 4,792,988 | 12/1988 | Ohashi et al. . |
| 4,804,967 | 2/1989 | Ohe et al. . |
| 4,819,001 | 4/1989 | Ohe et al. . |
| 4,823,142 | 4/1989 | Ohe et al. . |
| 4,849,750 | 7/1989 | Andros et al. . |
| 4,850,030 | 7/1989 | Hashimoto et al. ............... 455/31 |
| 4,851,830 | 7/1989 | Andros et al. . |
| 4,853,688 | 8/1989 | Andros et al. . |
| 4,856,083 | 8/1989 | Makino . |
| 4,857,915 | 8/1989 | Andros et al. . |
| 4,873,532 | 10/1989 | Sakurai et al. . |
| 4,879,570 | 11/1989 | Takizawa et al. . |
| 4,891,637 | 1/1990 | Siwiak et al. . |
| 4,894,856 | 1/1990 | Nakanishi et al. . |
| 4,897,835 | 1/1990 | Gaskill et al. . |
| 4,935,732 | 6/1990 | Andros et al. . |
| 4,965,607 | 10/1990 | Wilkins et al. . |
| 5,017,926 | 5/1991 | Ames et al. .................... 342/353 |
| 5,027,431 | 6/1991 | Tanaka et al. ................... 455/214 |
| 5,032,845 | 7/1991 | Velasco . |
| 5,046,130 | 9/1991 | Hall et al. . |
| 5,052,049 | 9/1991 | Andros et al. . |
| 5,054,120 | 10/1991 | Ushiyama et al. . |
| 5,055,851 | 10/1991 | Sheffer . |
| 5,063,560 | 11/1991 | Yerbury et al. . |
| 5,073,976 | 12/1991 | Kennedy . |
| 5,077,834 | 12/1991 | Andros et al. . |
| 5,099,245 | 3/1992 | Sagey .............................. 342/357 |
| 5,119,102 | 6/1992 | Barnard ........................... 342/357 |
| 5,122,795 | 6/1992 | Cubley et al. . |
| 5,136,719 | 8/1992 | Gaskill et al. . |
| 5,142,281 | 8/1992 | Park . |
| 5,146,227 | 9/1992 | Papadopoulos . |
| 5,153,582 | 10/1992 | Davis . |
| 5,155,688 | 10/1992 | Tanaka et al. . |
| 5,155,689 | 10/1992 | Wortham ......................... 364/460 |
| 5,166,694 | 11/1992 | Russell et al. . |
| 5,206,643 | 4/1993 | Eckelt . |
| 5,208,756 | 5/1993 | Song .............................. 364/449 |
| 5,218,367 | 6/1993 | Sheffer et al. .................. 342/457 |
| 5,225,842 | 7/1993 | Brown et al. .................... 342/357 |
| 5,225,847 | 7/1993 | Roberts et al. . |
| 5,227,804 | 7/1993 | Oda . |
| 5,254,986 | 10/1993 | DeLuca . |
| 5,258,985 | 11/1993 | Hammerle . |
| 5,266,945 | 11/1993 | Peek et al. . |
| 5,278,568 | 1/1994 | Enge et al. ..................... 342/367 |
| 5,280,640 | 1/1994 | Bae . |
| 5,301,358 | 4/1994 | Gaskill et al. . |
| 5,355,522 | 10/1994 | Demange ......................... 455/62 |
| 5,361,258 | 11/1994 | Arnold et al. ................... 370/69.1 |
| 5,371,899 | 12/1994 | Kuznicki et al. ................ 455/34.1 |
| 5,386,435 | 1/1995 | Cooper et al. .................. 375/200 |
| 5,392,452 | 2/1995 | Davis .............................. 379/57 X |
| 5,410,737 | 4/1995 | Jones ............................. 379/59 X |
| 5,438,329 | 8/1995 | Gastouniotis et al. ........... 455/67.1 X |
| 5,475,868 | 12/1995 | Duque-Anton et al. ......... 455/62 |
| 5,481,571 | 1/1996 | Balachandran et al. ......... 455/134 X |
| 5,485,463 | 1/1996 | Godoroja ........................ 370/95.1 |
| 5,487,178 | 1/1996 | Hanninen ........................ 455/56.1 X |
| 5,497,505 | 3/1996 | Koohgoli et al. ............... 455/34.1 |
| 5,508,708 | 4/1996 | Ghosh et al. ................... 455/56.1 X |
| 5,526,401 | 6/1996 | Roach, Jr. et al. ............. 379/59 |
| 5,530,701 | 6/1996 | Stillman et al. ................ 455/62 X |

LOW COST WIDE AREA NETWORK FOR DATA COMMUNICATION USING OUTBOUND MESSAGE SPECIFYING INBOUND MESSAGE TIME AND FREQUENCY

FIELD OF THE INVENTION

This invention relates generally to radio communication systems, and in particular to a low cost wide area data communications network making use of a high frequency (HF) base station radio network for inbound links and a centralized controller for coordinating use of the HF links.

BACKGROUND OF THE INVENTION

There exists a vital and continuing need for wireless communication networks of various types. One particular type of wireless system is focused on the need for reliable two-way data communications. Such networks need not support particularly high data exchange rates, but should provide communication over as wide a geographic area as possible, such as the continental United States.

Unfortunately, existing and even certain proposed systems costing many millions of dollars have failings of one type or another. Consider, for example, existing, wireless wide area data networks which support communication between a remote or mobile field unit and a base station. These networks either use terrestrial or satellite-deployed base stations. Terrestrial systems can be further classified as either one-way or two-way. One-way terrestrial systems, such as nationwide paging networks like SkyTel, provide no capability for a remote user to send data. Although certain types of paging networks do support two-way data transfer, they only provide limited geographic coverage. In addition, such networks also typically exhibit relatively poor penetration of building structures, due to the high carrier frequencies at which they operate.

Other existing and proposed two-way terrestrial systems include the cellular networks, mobile data networks such as RAM, ARDIS, emerging PCS networks, EMBARC, and many others. While the data rates of these systems are typically quite high, each system requires the users to be within a close range, generally 20 miles or less, of the system infrastructure. This infrastructure is extremely expensive, requiring hundreds of millions of dollars to build a nationwide network. It can sometimes be cost effective to build such infrastructure in areas of high population density, and indeed, roughly 90% of the United States population can be supported by such systems. However, this terrestrial infrastructure only covers approximately 15–20% of the country geographically. It is simply not economical for providers of such services to install the required infrastructure in remote areas of low population density.

Several satellite networks, both existing and proposed, have been designed to address the issue of poor geographic coverage. These satellite-based systems typically require a tremendous investment in infrastructure. The infrastructure is located in orbit where it cannot be installed, maintained or replaced without large expenditures for space-launch vehicles. In addition, the mobile subscriber devices required to communicate with such systems are relatively expensive. Furthermore, the field devices need to be within the line of sight of the satellite, since they must typically have overt, high gain electromagnetic reception devices such as dishes or long antennas. Such systems are thus impractical for certain applications.

Consider the problem faced by the manager of a fleet of rental cars. The assets for which the manager is responsible are highly mobile—indeed, they can be located virtually anywhere in the continental United States. The assets are easily stolen and expensive to insure. The assets can also become unproductive when a rental customer fails to return a vehicle to its proper location. Rental cars can also become 'lost' when there is poor communication between retail outlets, and valuable up-time of the rental asset is then squandered.

Another issue important to managers of rental fleets is the safety of their customers. Rental car drivers, and in fact, all drivers, could benefit from a system from which it would be possible to summon emergency assistance at any time, from any location, without leaving the vehicle.

Analogous problems existing in other industries. For example, there is increasing pressure on the railroad industry to move towards scheduled service, to facilitate just-in-time delivery in an effort to better compete with the trucking industry. To achieve this goal, the manager of a railroad system would ideally be able to quickly determine the location of each and every rail car on a regular basis, no matter where the rail car is located. Optimum routing and delivery time could then be accurately predicted.

In both such applications, the fleet manager would very much like to be able query a remote device, in order to determine its location, but with minimum cost. For example, current cellular mobile telephone service carries with it relatively high connect time charge and monthly service fees, and fleet managers thus do not consider such systems as being cost effective.

Other industries, such as the trucking and shipping industries, could also benefit from the ability and inexpensively to accurately track the location of shipping containers no matter where they are located. Any one shipping container may hold thousands or potentially millions of dollars of valuable goods, and clearly, those responsible for the well being of the goods in transit would like to know where they are at all times.

Similar demands are made in remote meter or sensor reading, facility monitoring, security, buoy monitoring, and other applications.

While the needs of each such application could be met by combining a position sensing device such as a Global Positioning System (GPS) or Loran receiver in each remote field unit together with an existing two-way mobile data communication device such as a cellular or satellite transceiver, the system would exhibit the aforementioned difficulties of high installation and operation cost, and the inability to operate in anything but a region of direct line of sight or close proximity to the system infrastructure.

DESCRIPTION OF THE INVENTION

Object of the Invention

It is an object of this invention to provide a data communication system in which relatively small amounts of data can be retrieved from very remote or highly mobile sources only on an infrequent basis, but in near real-time, at minimum cost.

The system should be two-way, that is, communication should be possible both from a central base station to a remote field unit, and well as from the field unit back to the base station.

Another object of this invention is to provide ubiquitous coverage over a wide geographic area such as the continental United States, while requiring a minimum of capital expenditures for new infrastructure.

In addition, such a system should make use of simple and economical field devices, costing far less than, for example, a comparable geostationary satellite data terminal.

The field units should not require direct line of sight with a base station unit for communication to be successful and reliable.

The field units should also be able to operate on battery power, eliminating the need for external power supplies as typically required for geostationary satellite receivers.

Any data transfer mechanism utilized should provide very high reliability service, on the same order as that of radio broadcasters.

Finally, the use of the system should cost the customer far less than existing paging, cellular, and satellite systems.

SUMMARY OF THE INVENTION

Briefly, the invention is a communications system that provides ubiquitous wireless data communication services, such as throughout the continental United States, by using a network of only a few, widely distributed radio base station sites. The radio base stations receive data from remote or mobile field units using long distance, well-proven radio technology such as that operating on short wave carrier frequencies such as the High Frequency (HF) radio band. The field units collect data available remotely, such as geopositional data. The field units use an HF transmitter to report the remote data to the base station whenever requested to do so.

A network hub or message operations center (MOC) unit controls the radio base station sites and the field units from a central location. The MOC receives information from each radio base station as to which HF frequencies appear to be available for burst transmission. Upon request for communication with a particular field unit, the MOC then selectes one of the available HF frequencies, and a timeslot for a particular field unit to transmit, and issues an outbound request message to the field unit which includes data indicating the HF frequency and timeslot.

The outbound request message to the remote field unit may be transmitted using any inexpensive wireless infrastructure such as the existing one-way paging network infrastructure. The outbound message may also be communicated by other types of sub-systems, such as cellular, satellite, or other radio transmission means.

More particularly, a customer initiates a request to communicate with a particular remote unit, such as a request for the field unit to determine and report its location. The MOC then polls the network of radio base stations, to chose a frequency within the HF spectrum which is presently available to some number of the base stations for the remote unit to send an inbound message back to the base stations. The MOC may also use an estimated probability of propagation in the process of choosing a frequency.

The frequency choice and a time for remote to respond are then formatted into an outbound message. The outbound message is then communicated to the remote unit in question using the outbound message infrastructure, such as a paging system or other wireless network.

When the field unit receives the outbound message, it collects data to formulate an inbound response, such as by reading data from its associated geolocation receiver, or by reading other data that is available to it. The field unit then sends its response as an inbound message back to the radio base stations at the indicated HF carrier frequency and time, in the form of a short duration burst message.

The inbound message is preferably encoded with a broadband encoding scheme such as spread spectrum modulation, to minimize the probability of interfering with existing broadcast or other communications at nearby frequencies in the HF band.

Time synchronization between the radio base stations and field units may be by any convenient method such as known time sounders, or by time reference signals available from the geolocation or paging receiver.

Upon receipt of a message from a field unit, the base station then forwards the message back to the MOC, which in turn forwards the message to the customer who initiated the request to communicate.

The system of the present invention thus consists of five different sub-systems, including the calling stations, the message operations center (MOC), the remote field units, the outbound signaling network, and the inbound radio base station network.

The calling stations provide an interface for the customers of the system. They include a platform such as a personal computer and modem, for accepting a request from a customer for communication with a particular remote field unit, reporting the request to the MOC, receiving the field unit's report from the MOC, and then displaying the report back to the customer. The calling stations are connected to the MOC through any convenient method, such as by modem connected to the public switched telephone network (PSTN).

The MOC, which is also a computer, performs a number of tasks. It accepts requests for communication with the field units from the calling stations and forwards the response of the field units back to the calling stations. The MOC also provides central control of the radio base stations, periodically receiving reports of available inbound link radio frequencies from the base stations and maintaining a database of such frequencies, and timeslots for which they are available. The MOC typically communicates with the base stations via modems using appropriate low cost land-based connections such as the PSTN, leased or private telephone circuits, Very Small Aperture Terminal (VSAT) wireless networks, or other cost-effective connections, depending upon the number and location of the base stations.

Upon receipt of a customer request from a calling station, the MOC selects one of the available frequencies and times from the database, and formulates an outbound request message with the selected frequency and time as data arguments. The MOC then forwards the outbound message to the outbound signaling link, requesting that the outbound message be sent to the field unit. This request to the outbound signaling link is typically sent via any convenient land-based media, such as the PSTN, VSAT, or other type of data communications network.

The MOC then alerts one or more of the associated base stations to expect a response from the indicated field unit at the specified frequency and time. Upon receipt of an inbound message from one or more of the base stations, the MOC then forwards the information in the message to the calling station.

The outbound signaling link may be any convenient low-cost radio transmission system for transmitting data. Although existing paging network infrastructures are ideally suited for the outbound link, it should be understood that other systems can be used as well, such as a private radio network, cellular mobile telephone (CMT) network, satellite network, or any other appropriate wireless transmission system.

In certain instances, the outbound signaling link may require the use of several different sub-systems in order to support the desired wide area coverage. For example, consider an instance where the outbound links are provided by the existing paging system infrastructure. Because any given field unit may be located anywhere in a broad geographic area, and because any given paging system has only a limited service area, and to avoid the need for expensive simulcast paging services, the MOC preferably further expedites transmission of the outbound message by maintaining a database of paging system locations as well as a database of the last known location of each field unit. After forming the outbound message, the MOC then determines the identity of the paging system closest in physical location to the last known location of the field unit. The outbound message is then forwarded to the nearest paging system first. In the event that the outbound message does not elicit the expected response from the expected field unit, the MOC assumes that the field unit has moved outside the area covered by the last known valid paging system. The MOC then successively tries to forward the outbound message to other paging systems located farther and farther from the last known location of the field unit, until a reply is successfully received.

Regardless of the outbound link arrangement, the radio base stations perform several functions. First, to assist in the MOC's determination of which frequencies are unoccupied and available for transmission, each radio base station periodically checks each possible inbound link channel to determine if the channel is in use. This may be done, for example, by measuring a receive power level in each channel, or by sampling sub-bands in each channel and integrating the detected signal power level over time, or by using other known signal detection algorithms.

To effectuate reception of the inbound messages from the field units, the radio base stations each include a pool of tunable HF receivers and modems. Upon accepting a command from the MOC to expect an inbound message from a particular field unit at a particular frequency and time, each base station then allocates an HF receiver and modem from the pool, waits for reception of the inbound message, and then formulates a report back to the MOC.

For example, if a inbound message is received successfully from the field unit, the data from the inbound message is reported back to the MOC as the page response message. If, however, no inbound message is received at the indicated time and frequency, a failure of the inbound link is reported back to the MOC.

The field units each receive an outbound message signal containing data representing an identification tag specific to that field unit, and a frequency and time at which the field unit is to originate the inbound message. Other data may also be included in the inbound message, as dictated by the particular application for the system.

Upon receipt of such an inbound signal, the field units collect data to be reported back to the MOC, such as latitude and longitude from a geolocation system, or data inputs from other sensors or equipment connected to the field unit. The field unit then generates the inbound message from these inputs and transmits the inbound message at the specified frequency and time, over the HF link, to the radio base stations.

A communication system according to the invention provides several advantages.

The system permits relatively small amounts of data to be retrieved from very remote or highly mobile sources in near real-time, at minimum cost.

It is possible to communicate messages from a central source to a remote field unit, and to have the field unit respond to that message by providing data.

Ubiquitous coverage over a wide geographic area such as the continental United States is possible using the paging system for outbound messaging and a small network of short wave radio receiving base stations. The system thus requires a minimum of capital investment for new infrastructure.

In addition, the field devices make use of short wave transmitters, which do not require direct line of sight to reliably communicate with the radio base stations.

The field units may operate on battery power, much as conventional paging receivers, since the transmit unit is only activated infrequently, and even then, only for a short duration burst inbound message.

BRIEF DESCRIPTION OF THE DRAWINGS

The above and further advantages of the invention may be better understood by referring to the following description in conjunction with the accompanying drawings in which.

DETAILED DESCRIPTION OF A PREFERRED EMBODIMENT

Figure 1:
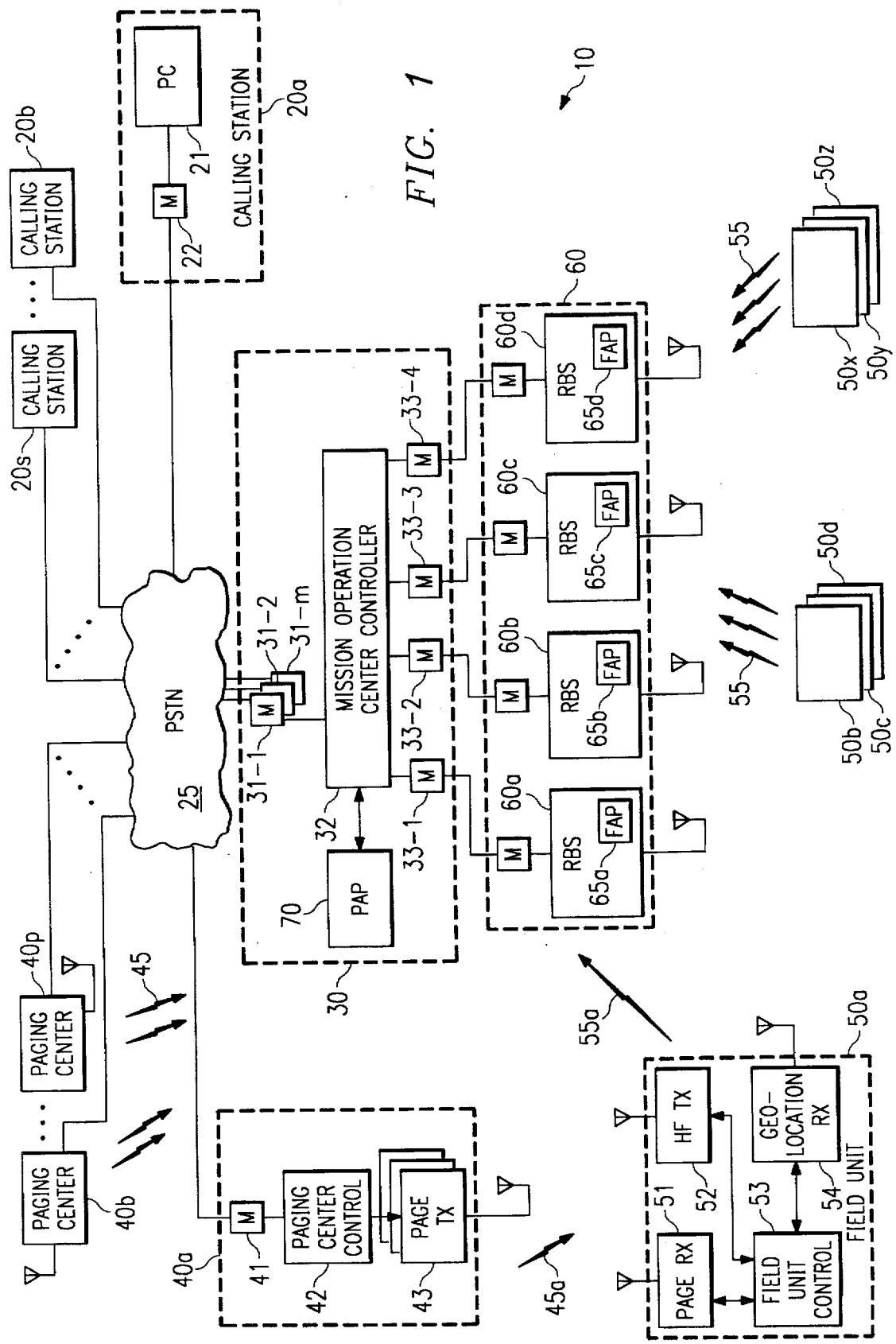
FIG. 1 is a block diagram of a two-way radio communication network according to the invention.

Turning attention now to the drawing figures, FIG. 1 illustrates a block diagram of a two-way wireless communications system 10 according to the invention. The system 10 includes a number, s, of calling stations 20a, 20b, . . . , 20s (collectively, calling stations 20), a data communication mechanism 25, a message operations control (MOC) center 30, a number, p, of geographically dispersed outbound messaging sub-systems 40a, 40b, . . . , 40p which cover a wide geographic area such as the continental United States or Europe, multiple mobile or remote field units 50a, 50b, 50c, 50d, . . . , 50x, 50y, 50z, and an inbound messaging sub-system which may make use of a number, such as approximately four, of radio base stations (RBSs) 60a, 60b, 60c, and 60d, which are also geographically dispersed to provide ubiquitous coverage.

The data communication mechanism 25 may preferably be a public switched telephone network (PSTN), as shown. However, private networks, Very Small Aperture Terminal (VSAT) networks, and other types of communication networks may be used.

The outbound messaging systems 40 provide radio links 45 which are used for communication from the system 10 to the remote field units 50. These radio links are referred to here as the outbound links 45. In a preferred embodiment, the outbound links 45 may be provided by multiple paging sub-systems 40. However, other systems such as nationwide paging systems, satellite networks, private radio networks and the like can be used to provide the outbound links 45. Thus, while the outbound messaging system 40 may be referred to in some instances here as a paging system, it should be understood that other types of outbound radio links may be used as well.

Radio communication from the field units 50 back to the system 10, which are implemented using the network of RBSs, are referred to as the inbound links 55. The inbound links 55 are preferably spread spectrum encoded, short wave radio links operating in the high frequency (HF) radio band.

In operation, a customer of the system 10 uses one of the calling stations 20 to initiate a request to communicate with a particular one of the field units 50a, such as a request for the field unit 50a to report its physical location. The customer's request is communicated over the network 25 to the MOC 30, which in turn forwards the request to the field unit 50a using one or more of the outbound messaging sub-systems 40. To coordinate use of a particular one of the inbound links 55a, the MOC determines a frequency and time for the field unit 60 to use which is reported as being available at some number of the base stations 60. The outbound message on an outbound link 45a thus consists of data indicating the frequency and time at which the remote field unit 50a may signal the radio base stations 60 with its information. At the indicated time and frequency, a message is received from the field unit 50a by one or more of the base stations 60, and the message is then forwarded to the MOC 30. The MOC 30, in turn, then supplies the requested data to the customer at calling station 20a over the network 25.

As a result, a wireless communications system 10 according to the invention provides two-way communication on a near real-time basis across a broad geographic area such as may be conveniently covered by a network of only a few short-wave radio base stations 60. This architecture eliminates the need for costly, custom and ubiquitous or expensive infrastructure as now required by cellular and other terrestrial systems as well as satellite-based systems. For example, existing paging sub-systems my be used to provide the outbound links 45, and the network 25 may be the public switched telephone network. The system is thus far more maintainable and less expensive to support then competing cellular, multicast paging, or satellite systems.

In addition, the radio systems in the remote field units 50 operate only when a customer initiates a request for data. Thus, the field units can be designed to operate with minimal standby power as available from a battery or solar power, which is ideal in remote locations in which access to external power is not readily available, reliable or secure.

Because the radio base stations 60 use short-wave HF signaling, a direct line-of-sight is not required between the radio base stations 60 and the remote field units 50, and thus the system 10 will operate properly even in situations where line-of-sight propagation is not possible, such as in stacked containers or in densely populated urban areas. The system 10 thus exhibits greater availability than competing satellite-based systems.

Each of the components of the communication system 10 and its operation will now be discussed at an increased level of technical detail in order that one of skill in the art may more readily understand how to build and operate such a system 10.

Message Formats (FIGS. 2A through 2D)

Figure 2A:
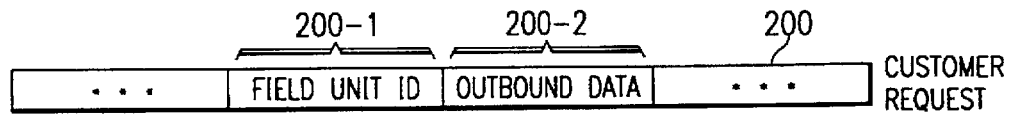
FIG. 2A illustrates the format of a message sent by a customer of the system from a calling station to a message operations center (MOC) control unit.

The format of a message 200 sent from the calling station 20 to the MOC 30 is shown in FIG. 2A. At a minimum, the message 200 includes at least one data field 200-1 indicating a identification (ID) code for the field unit 50a from which the customer is requesting data. In addition, however, data to be sent to the field unit 50a from the calling station 20a may be contained in one or more outbound data fields 200-2.

Figure 2B:
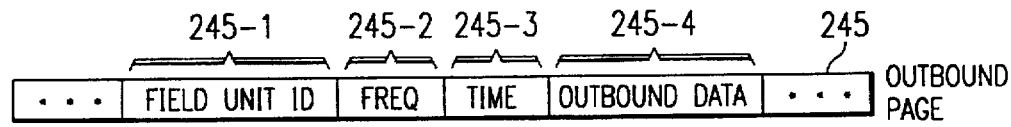
FIG. 2B illustrates the format of an outbound message sent from the MOC to a field unit using a paging network.

FIG. 2B shows the format of an outbound message 245 sent over the outbound links 45 to the field units 50. The message 245 consists of a field unit ID code 245-1 and outbound data 245-4 as originated by the calling station.

In addition, the message 245 includes a frequency field 245-2 and time field 245-3 indicating a transmission frequency and a time of day at which the remote unit 50a is to signal the RBSs 60.

Figure 2C:
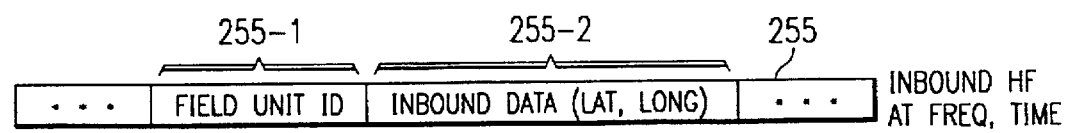
FIG. 2C illustrates the format of an inbound response message sent from the field unit to a remote base station (RBS) at a particular time and frequency within a shortwave radio band, and as forwarded from the RBS to the MOC.

FIG. 2C shows the format of the inbound message 255 returned by the field units 50a over the inbound links 55, including a field unit ID field 255-1 as well as inbound data field 255-2 containing data being returned from the field unit 50a. Such inbound data 255-2 may, for example, in the case of a mobile field unit 50, include information concerning the position of the field unit in latitude and longitude form. However, it should be understood that the field unit 50 may be stationary and/or that other types of inbound data 255-2 may be sent, depending upon the customer's application.

Figure 2D:
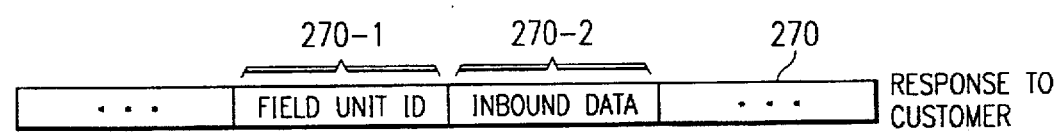
FIG. 2D illustrates the format of the inbound message as sent from the MOC back to the calling station.

Finally, FIG. 2D illustrates the format of the message 270 sent by the MOC as a response to the calling station 20a. The message 270 includes the field unit ID 270-1 if necessary, as well as the inbound data 270-1 returned.

It should be understood that the illustration of the message formats, in FIGS. 2A through 2D is not restrictive, and that the various fields 200-1, 200-2, 245-1, . . . , 255-1, . . . , 270-1, 270-2 may occur in any order in each respective message. Each message 200, 245, 255, and 270, will also typically have additional fields such as header fields, checksums, routing or synchronization information and other fields as normally required in any message communication system.

Calling Stations 20

Calling stations 20a, 20b, . . . , 20s provide an interface for customers to interact with the system 10. A typical one of the stations 20a is embodied as a personal computer (PC) 21 having an appropriate standard, well-known communications device such as a computer modem 20-2 to exchange messages with the MOC 30 over the PSTN 25. The MOC thus also has a bank of computer modems 31-1, 31-2, . . . , 31-m to communication with multiple calling stations 20. The message requesting communication with a particular field unit 50a thus typically travels from the calling station 20a to the MOC 30 via temporary dial-up connection over the PSTN 25.

Message Operations Center (MOC) 30

The MOC 30 also includes a computer, referred to as the message operations center (MOC) controller 32, and multiple modems 31-1, 31-2, . . . , 31-m, 33-1, 33-2 . . . , 33-4.

The MOC uses the modems 31 for communications over the network 25 with at least the calling stations 20 and paging centers 40.

The MOC may also preferably use other modems 33-1, 33-2, 33-3, and 33-4 to communicate with the radio base stations (RBSs) 60. However, because the MOC needs to communicate frequently with the RBSs, and since there are only a handful, such as four RBSs, the MOC may also use modems 33 which are connected to dedicated telephone circuits such as leased lines, packet switch networks, or other cost-effective, high data-rate longline services.

As mentioned above briefly, upon receiving the customer request message 200 from one of the modems 31, the MOC controller 32 issues an outbound message 45 with a frequency and a time for the field unit to use for its response, retrieves inbound data from RBSs, and then forwards the inbound data to the indicated field unit 50a.

Figure 3:
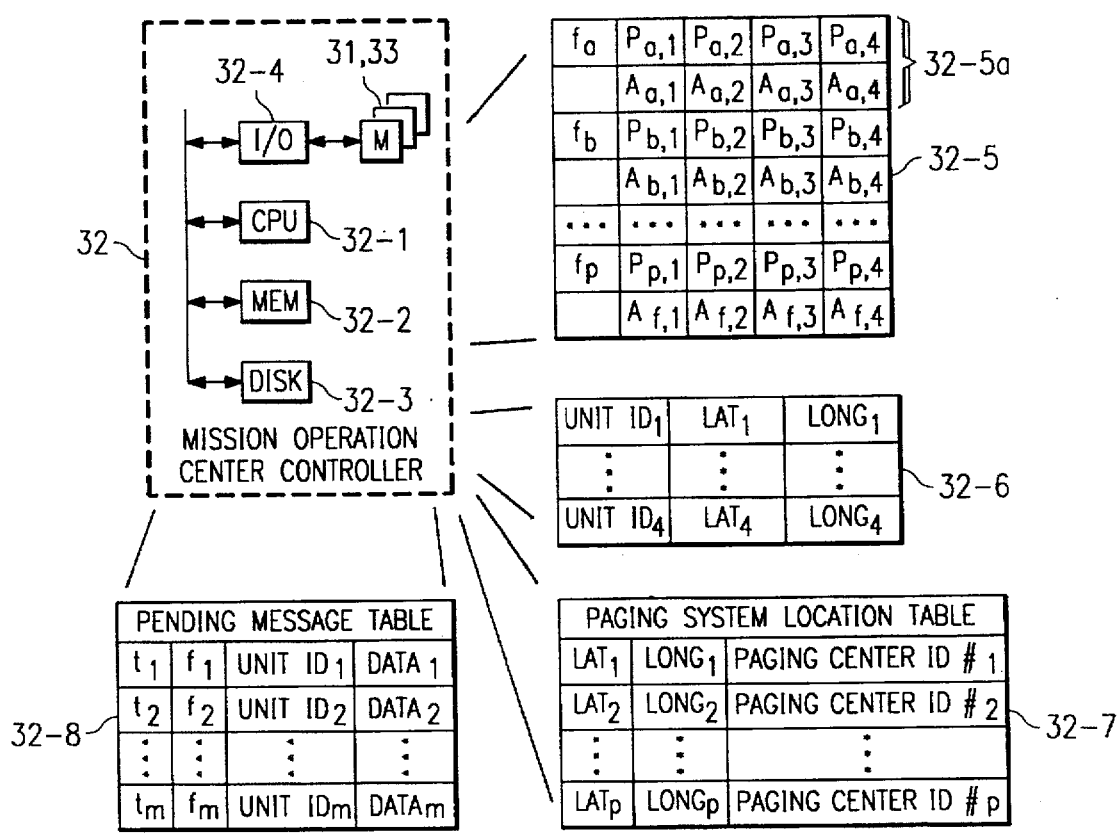
FIG. 3 is a block diagram of a MOC control unit showing several databases, or tables, maintained by the MOC.

FIG. 3 shows a more detailed block diagram of the MOC controller 32 and the various databases 32-5, 32-6, 32-7, and 32-8 that it maintains in order to complete these tasks.

The MOC controller 32 includes the usual components of a computer system such as a central processing unit (CPU) 32-1, memory 32-2, disk storage 32-3, and input/output (I/O) interface 32-4. The modems 31, 33 communicate with the MOC via the I/O interface 32-4. Because the MOC controller 32 is primarily responsible for coordinating communication between a number of different devices, the architecture of the computer system is chosen to be an appropriate interrupt-driven or multitasking system.

In order to determine the frequencies to be used by the field units 50, the MOC maintains a first database referred to as a frequency availability table 32-5. This table includes a number of data entries, n. Each of the n entries in table 32-5 consists of a frequency, f, a list of receive signal amplitudes A1, A2, A3, and A4, and, preferably, a propagation probability factor, P.

An entry is made for each available frequency in the HF spectrum as reported to the MOC controller by the RBSs 60. The precise manner in which each RBS 60 determines an available frequency is discussed in detail below. It suffices here to say that a given RBS, such as RBS 60-1 (FIG. 1) periodically reports a list f1, f2, . . . , fn of available frequencies, or open channels, that the RBS 60-1 is presently seeing, and the noise amplitude level A1-1A, . . . , A1-n, associated with each such frequency. Likewise, the other RBSs 60-2, 60-3, and 60-4 also periodically report their respective list of frequencies and amplitude levels A2-1, A2-2, . . . , A3, . . . , A4-n.

The propagation probability, P, for each frequency in the table 32-5 can be determined by knowing the time of day using known ionospheric modeling algorithms. However, more sophisticated propagation prediction algorithms may be used.

A second table 32-6 is preferably used to keep track of the last known location of each deployed field unit 50. Each entry in this table consists of a field unit ID code, and position information as last reported by the field unit, such as a latitude and longitude. The MOC controller 32 maintains and updates this database 32-6 as field units 50 are enabled or removed from service and as inbound messages 255 are returned by each field unit indicating its latitude and longitude.

As mentioned above, in the preferred embodiment the outbound links 45 are provided by several paging subsystems 40. A third table 32-7 is thus used for paging sub-system location data. Each entry in this table contains an approximate latitude and longitude, a range of latitudes and longitudes, as well as an identification code for each paging sub-system 40 associated with the system 10. This table 32-7 is updated whenever arrangements for the use of various paging systems are made by the operator of the system 10. The table 32-7 may also include details of how the MOC controller 32 can access each different paging system, such as modem telephone numbers, protocol types, and the like.

It should be understood that the tables 32-6 and 32-7 are not needed if a nationwide multicast paging network is used to implement the system 10; however, if the system 10 does keep track of the field unit 50 location and does make use of conventional paging systems 40, it can offer its service at low cost.

A final table 32-8 is a pending message table. The entries in this table include data concerning each message in transit to one of the field units 50, such as a field unit ID, the assigned time, t, and frequency, f, at which a response is expected, and other data that may be necessary to avoid conflicting assignments of access to the available channels.

Figure 4:
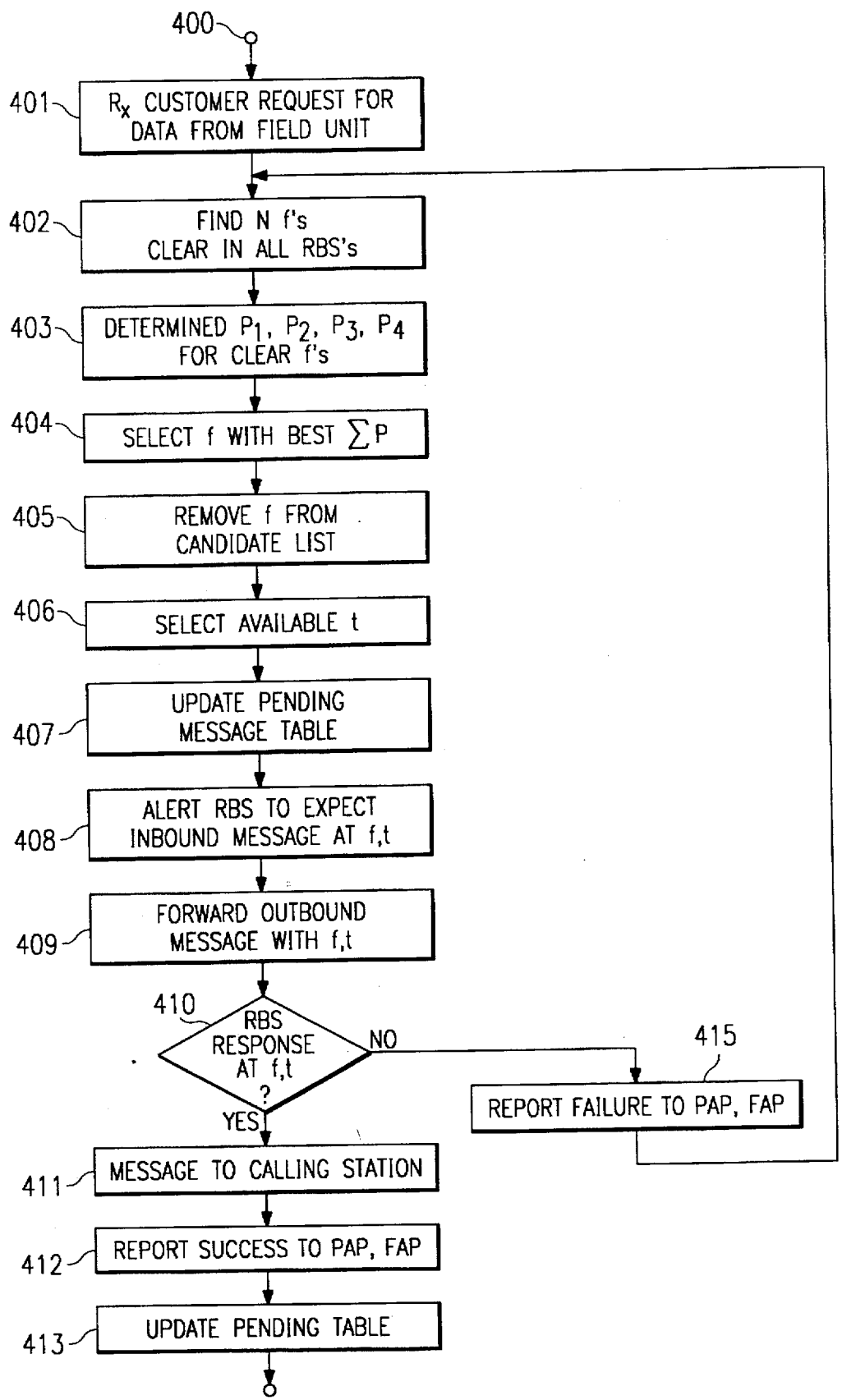
FIG. 4 is a flowchart of the operations performed by the MOC upon receipt of a customer message requesting data from a particular field unit, and the steps performed to generate the outbound page message.

FIG. 4 is a flowchart of the operations performed by the MOC controller 32. From an idle state 400, the MOC controller 32 begins the sequence of steps illustrated upon receipt of a customer request from a calling station, in step 401.

Next, in step 402, the MOC controller 32 selects one of the available HF link frequencies, f, and times, t, from the frequency availability table 32-5 that it maintains.

In selecting the frequency to be utilized, the MOC controller 32 attempts to minimize the noise and interference power on the frequencies in use by all of the RBSs. Thus, for example, since other users appear as noise or interference, and since the exact location of the field unit is not known, the MOC preferably chooses a frequency which is reporting the lowest average noise power across all four of the RBSs 60. This minimizes the chance of interfering with another user of the HF spectrum.

Other techniques may be used to refine the frequency selection process. For example, the MOC controller 32 may permanently exclude from the frequency selection process as necessary designated portions of the HF radio spectrum known to contain fixed transmitters or known interferers.

In addition, the propagation probability factor, P, may be used to further refine the selection of a frequency, f. For example, if a frequency is clear, that is, each of the four RBSs reported low noise amplitudes A1, A2, A3, A4 for that frequency, but the probability of successful propagation is low, then another frequency is selected from the table 32-5.

In addition, minimizing the time between observing a clear frequency and then selecting it for transmission in step 402 is also key to successful communication, and is the reason why the RBSs are requested to update the frequency availability table 32-5 in real time. The system 10 is thus designed so that the MOC controller 32 utilizes the identifies clear frequency within several seconds, and then abandons it.

In designing the system 10, a computer model of the probability of the occurrence of a conflicting use in the European environment was made. The European environment is typically much more demanding than the average environment in the United States. The table below shows the probability that a frequency will be utilized by another conflicting user after the system has identified it as clear and before the transmission has occurred.

| Elapsed Time From Frequency Choice | Interference Probability |
|---|---|
| 3 seconds | 0.01 |
| 10 seconds | 0.03 |
| 30 seconds | 0.10 |
| 1 minute | 0.15 |
| 6 minutes | 0.63 |

The above table can thus be used to determine how often the frequency availability table should be updated, depending upon a desired probability of interference with the inbound link.

In any event, in step 403, the pending message table 32-8 is consulted to determine a free time, t, for the selected frequency, f. Once the time is selected, a new entry in the pending message table is made for the current outbound message 245, in step 404.

Next, in step 405, the RBSs 60 are alerted to expect an inbound message 255 at the determined frequency, f, and time, t.

If the outbound links 45 are provided by paging systems 40, additional steps must be performed here. In particular, because any given field unit 50 may be located anywhere in a broad geographic area, and because any given paging system 40 has only a limited service area, and to avoid the need for expensive simulcast paging services, the MOC controller 32 preferably performs steps 406 and 407.

In step 406, the MOC consults its field unit location table 32-6 and paging center location table 32-7. Now knowing the identity of the target field unit 50a from the customer request message 200, the MOC control 32 can thus determine the last known location of the target field unit 50a by consulting the field unit location table 32-6. The identity of the paging system nearest to the last known location of the field unit 50a is then determined, by comparing the entries in the paging system location table 32-7 against the last known latitude and longitude.

The outbound page message 245 containing the indicated frequency, f, and time, t, is then forwarded to the expected nearest paging system, in step 407, requesting that the remote unit 50a be paged. This request to the paging system 40a is then sent over the network 25 (FIG. 1).

In step 408, the MOC controller 32 then waits for a response from the field unit 50a to be reported by the RBSs 60 shortly after the indicated time, t. Of course, given that the controller 32 is interrupt-driven or multitasking, in actuality, the controller 32 may perform many other tasks, such as servicing requests from other customer calling stations 20, while waiting for the response from unit 50a.

In the event that the outbound message 245 does elicit a proper response, in step 409 the inbound data from the unit 50a is then reported to the calling station 20a in the form of the response message 270. In step 410, the selected frequency and time are then removed as an entry in the frequency availability table 32-5, and the corresponding entry in the pending message table is also removed.

In the event that the outbound message 245 does not elicit the expected response from the field unit 50a, the MOC controller 32 assumes that the field unit has moved outside the area covered by the last known nearest outbound messaging sub-system 40. In step 412, the controller 32 then determines the location of the next nearest outbound sub-system 40, and returns to step 407 to successively try to forward the outbound message, until a reply is successfully received.

Outbound Radio Links 45 and Inbound Radio Links 55

All outbound links 45 preferably utilize existing FCC licensed communication media, such as the existing paging network 40 infrastructure. However, such outbound links 45 may also be provided by established public or private carriers such as a frequency modulated (FM) subcarrier network paging systems which use special radio networks, high frequency (HF) radio networks, or other types of suitable outbound radio links 45, depending upon the nature of the field units 50. For example, if the field units 50 are expected to be located in stacked containers, outbound links 45 must not be implemented using a radio communication methodology that requires line-of-sight. However, if the filed units are, for example, deployed in a remote well-logging application, line-of-sight communication may be adequate.

The inbound links 55 make use of a network of high-frequency (HF) radio stations 60 which operate with carrier frequencies in the radio spectrum from 3 to 30 MHz. There are two critical elements in establishing reliable communication in the HF inbound links from the field units 50 to the RBS network 60.

First, a remote field unit 50 must be instructed as to which frequencies in the HF band are propagating between itself and the network of RBSs 60. Due to the multiple atmospheric phenomena in HF communication, which occurs over long distances principally by ionospheric reflection, different portions of the spectrum from 3 to 30 MHz propagate in different directions at different times of the day.

Secondly, of those frequencies which are propagating, it must be known which channels are clear, that is which channels are not presently being used.

Paging Network 40

An exemplary outbound messaging sub-system may be a paging system 40a which is a standard paging system that can accept a request for a page from the network 25. As is known in the art, such paging systems 40a include a modem 41 for accepting page requests, a paging center controller 42 which is typically a computer of some type, and a number of paging system transmitters 43-, 43-1, . . . , 43-n. Given a page request that includes a paging field unit ID and message, the paging sub-system 40a formats and then broadcasts the outbound page message 245 in the conventional manner. The paging system 40a need not be a two-way system or otherwise require any acknowledgment of receipt of the page from the field units 50.

Field Units 50

Returning attention to FIG. 1 briefly, an exemplary field unit includes an outbound message receiver such as a paging receiver 51, an HF transmitter 52, a field unit controller 53, and data collection apparatus such as a geolocation receiver 54.

The paging receiver 51 is conventional. The field unit controller 53 is also a conventional control device, such as a microcomputer.

The geolocation system receiver 54 may be one of any known types such as a global positioning system (GPS) or Loran receiver.

Upon receipt of an outbound page message 45, an exemplary field unit 50a transmits an inbound message back to the RBS network 60, such as an inbound message 255 containing is current position or other data.

The inbound message 255 is then transmitted at the carrier frequency and time which was indicated by the outbound message 245. The transmission time-slots on the inbound communication links 55 may be synchronized using universal time standard data, as may be available from a GPS receiver 54 or other broadcast time standard transmitters.

Unique, non-interfering characteristics of the inbound HF links 55 are thus possible because the remote field units 50 already know, before transmitting, which frequencies are not in use at particular times. The frequency is then quickly vacated after its single use by the MOC controller 32, leaving it available for other uses, such as its regularly licensed use.

In addition, the field units transmit on only one of the open frequencies for a short period of time, of several seconds duration at the most. In particular, the field units 50 use a low-power, spread spectrum HF waveform having a duration of about one (1) to ten (10) seconds. The waveform may, for example, be an eight-level phase shift keyed (PSK) direct spread waveform with a bandwidth of 3 KHz, and a chip rate of about 2400. This provides a data rate of approximately 75 bits per second for inbound messages 255.

The HF transmitter 52 in the remote field unit 50a can thus be instructed by the unit controller 53 to hop to any 3 kHz channel in the 3–30 MHz HF spectrum.

Interference to voice users in the HF spectrum is thus minimal since the noise burst from the system 10, even if there is some interference would be similar to a typical HF channel fade. Other data users of the HF spectrum are also typically equipped to handle second-long channel fades and have typically implemented ARQ schemes or coding interleaving to avoid fading difficulties. Thus, other data users in the HF band should also not notice the existence of the system 10.

Radio Base Stations (RBSs) 60

Figure 5:
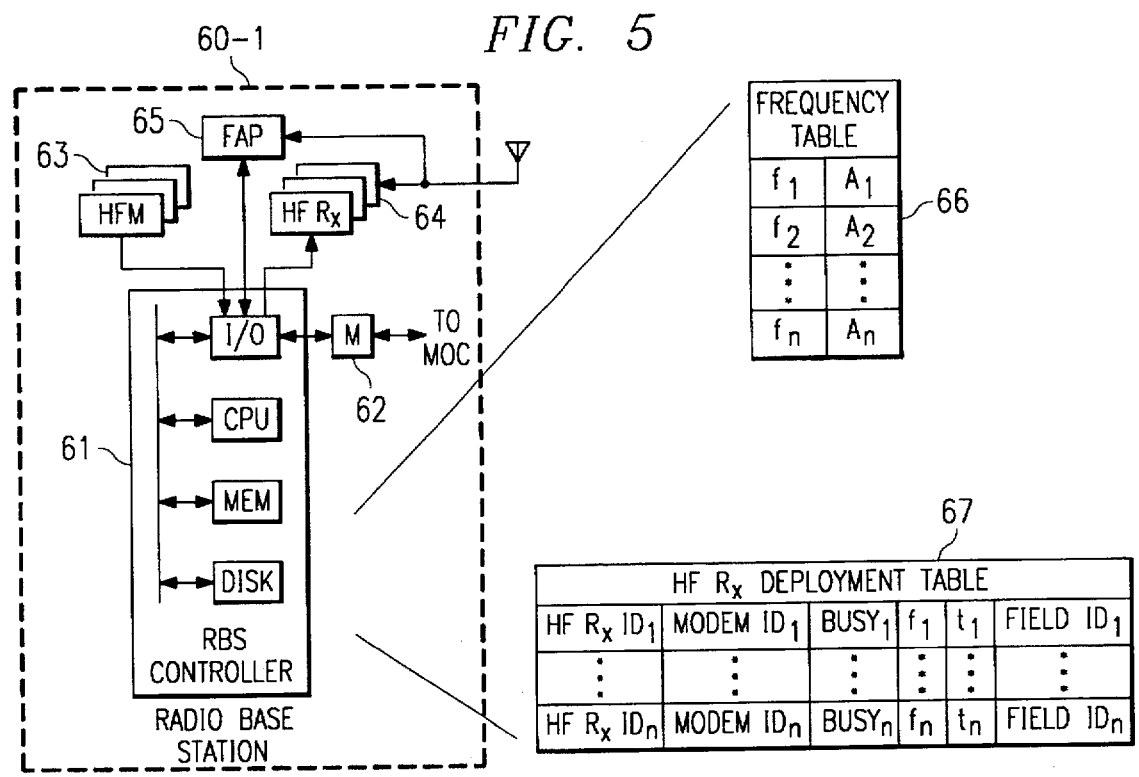
FIG. 5 is a block diagram of an RBS control unit also showing several databases that it maintains.

FIG. 5 is a block diagram of a typical radio base station (RBS) 60-1, consisting of a RBS controller 61, a landline modem 62, a pool of HF modems 63 and HF receivers 64, and a frequency analysis processor 65.

The RBS controller 61 is a conventional computer similar to the MOC controller 32. The RBS controller 61 uses the land line modem 62 to exchange messages with the MOC controller 32.

The RBS controller 61 maintains a real time database of available frequency channels such as frequency table 66. Each entry in the table 66 includes an HF frequency, f, and an observed noise level power amplitude measurement, A.

The frequency table 66 may be maintained by a frequency analysis processor (FAP) 65 which periodically determines the identity of clear operating HF frequencies on a regular basis. The FAP 65 may accomplish this by using a sweeping receiver, or may step one or more of the tunable HF receivers 64 throughout the HF frequency band. The FAP 65 also typically includes a computer or microcomputer.

The frequency table 66 may also contain reports of measurements of received signal strength from its own remote devices or known sounders to further assist the MOC controller in the prediction of available frequencies.

In most instances, the FAP has a good probability of finding a frequency which is not occupied by another user. Assuming a worst case time of day, such as sunrise, about 2 MHz of HF radio spectrum propagates in any given location. Given an assumption of 30% channel occupancy, which is based upon a empirical observations, the system 10 will typically always have at least 466 channels of the required 3 kHz bandwidth available.

Deployment of the HF modems 63 and associated HF receivers 64 is managed by the RBS controller 61 to monitor reception of inbound messages from the field units at the frequencies and times specified by instructions from the MOC controller 32. To assist in this process, an HF receiver deployment table 67 is maintained. Each entry in this table 67 contains an HF receiver ID, and associated HF modem ID servicing the channel, a busy field, B, indicating whether the HF receiver/modem pair are presently assigned. If the busy field indicates active status, the entry also contains a frequency, f, and time, t, at which a message is expected for the HF receiver, modem pair, as well as the ID of the field unit expected to send the message.

The HF receivers 64 are adapted to receive the spread spectrum waveform generated by the field units 50, as has already been described.

Figure 6:
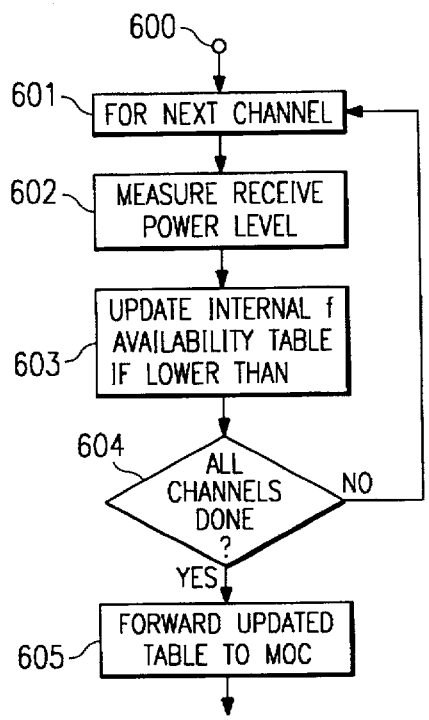
FIG. 6 is a flowchart of the operations performed by the RBS to periodically update a database of available frequencies.

FIG. 6 is a flowchart of the operations performed by a control processor in the FAP 65. From an idle state, in step 601 the FAP determines the identity of a next possible free HF channel. In step 602, the FAP then measures the receive power level, and in step 603, if the power level is sufficiently lower than a threshold amount, the FAP updates its internal table 66. In step 604, the process iterates until all of the channels are scanned. Finally, in step 605, the FAP forwards the updated table information to the MOC controller 32 over the PSTN 25.

Figure 7:
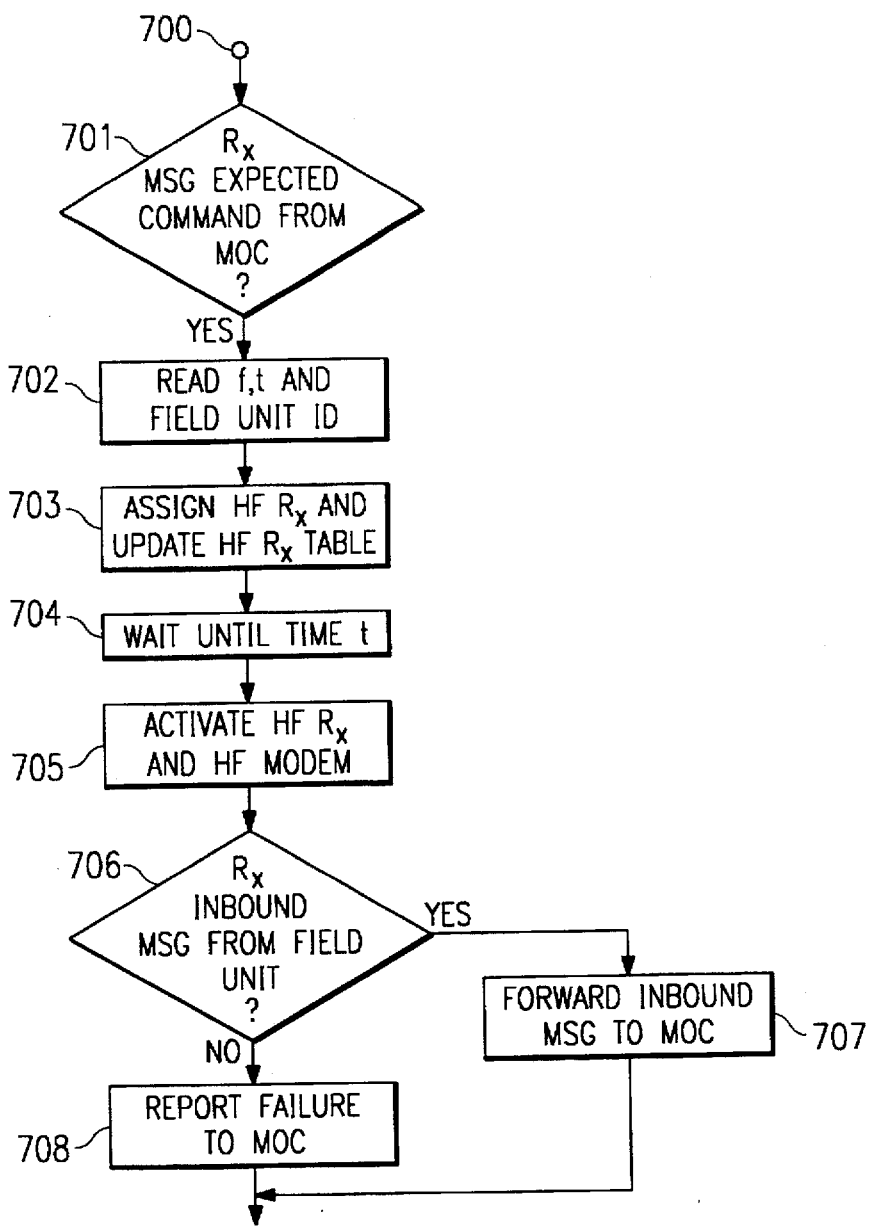
FIG. 7 is a flowchart of the operations performed by the RBS in order to verify reception of the inbound message.

FIG. 7 is a flowchart of the operations performed by the RBS controller 61 to receive an inbound message 255. From an idle state 700, the RBS controller moves to a step 701 upon accepting a command from the MOC controller 31 to expect to receive a message from a particular field unit at a particular frequency and time.

In step 702, the frequency, time and field unit ID are read from the MOC message.

In step 703, a free HF receiver and modem pair are identified by examining the local deployment table 67. The corresponding entry is then marked as busy and updated with the frequency, time, and field unit ID information.

The RBS then waits, in step 704, until time t approaches. Shortly before time t, that is, enough time in advance of time t to insure full on status of the chosen HF receiver, the HF receiver and HF modem pair are activated in step 705.

In step 706, it is then determined if an inbound message was received from the indicated field unit 50a at time t. If so, in step 707, the RBS forwards a report message back to the MOC that includes the data from the remote field unit in the inbound message 255, along the land based communication link between the RBS and the MOC, as the inbound page response message 255. If, however, no message is received at the indicated time and frequency, a failure of the link is reported back to the MOC in step 708.

What is claimed is:

1. A two-way wireless data communication system comprising:
   an outbound messaging sub-system for sending outbound messages;
   an inbound messaging sub-system consisting of a network of at least two radio frequency base stations for receiving inbound messages, the radio frequency base stations also continuously sampling, at their respective locations, a set of frequency channels in an inbound radio frequency band, to determine an observed frequency availability level for the set of frequencies for each base station;
   at least one remote field unit having an outbound message receiver and a tunable inbound message transmitter; and a central control unit, wherein the central control unit uses the outbound messaging sub-system as an outbound link to send an outbound message to the remote field unit, and uses the inbound messaging sub-system as an inbound link to receive an inbound message from the field unit, and wherein the outbound message comprises a time data field and a frequency data field indicating, respectively, an inbound message time and an inbound message carrier frequency at which the field unit is to send an inbound message in response to the outbound message, and wherein the central control unit receives reports of the observed frequency availability levels from the network of radio base stations, and the central control unit selects the time data field and frequency data field such that the inbound message will be received by one or more of the base stations in the inbound messaging sub-system without interference from another communication system.

2. A system as in claim 1 wherein the inbound messaging sub-system uses the high frequency (HF) radio frequency band as the inbound radio frequency band.

3. A system as in claim 2 wherein the outbound messaging sub-system is a paging sub-system.

4. A system as in claim 3 comprising multiple outbound messaging sub-systems, and wherein the central control unit first selects an initial outbound messaging sub-system for the outbound link, and if the central control unit does not receive a message on the inbound link at the selected time and carrier frequency, then the central control unit reinitiates the outbound message on a different outbound messaging sub-system.

5. A system as in claim 2 comprising multiple inbound links implemented by multiple radio base station receivers, and wherein the control unit assigns the carrier frequency depending upon the observed availability of that carrier frequency in each of the multiple radio base station receivers.

6. A system as in claim 1 wherein the central control unit additionally selects the inbound frequency by estimating a probability that radio energy at the inbound frequency will propagate.

7. A system as in claim 1 wherein the inbound message contains data representing a geolocational position of the field unit.

8. A two-way wireless data communication system comprising:
- a paging sub-system for sending outbound request messages to a remote field unit;
- an inbound messaging sub-system consisting of at least one radio base station for receiving inbound messages from the remote field unit, the at least one radio base station also continuously sampling, at its respective location, a set of frequency channels in an inbound radio frequency band, to determine an observed frequency availability level for the set of frequencies for the base station;
- at least one remote field unit having an outbound message receiver and a tunable inbound message transmitter; and
- a central control unit, wherein the central control unit uses the paging system as an outbound link to send an outbound message to the remote field unit, and uses the inbound messaging sub-system as an inbound link to receive an inbound message from the field unit, and wherein the outbound message comprises a time data field and a frequency data field indicating, respectively, an inbound message time and an inbound message carrier frequency at which the field unit is to send an inbound message in response to the outbound message, and wherein the central control unit receives reports of the observed frequency availability levels from the network of radio base stations, and the central control unit selects the time data field and frequency data field such that the inbound message will be received by one or more of the base stations in the inbound messaging sub-system without interference from another communication system.

9. A system as in claim 8 wherein the inbound messaging sub-system uses the high frequency (HF) radio frequency band as the inbound radio frequency band.

10. A system as in claim 8 comprising multiple inbound links implemented by multiple radio base station receivers, and wherein the control unit assigns the carrier frequency depending upon the observed availability of that carrier frequency in a plurality of the radio base station receivers.

11. A system as in claim 8 comprising multiple paging sub-systems, and wherein the central control unit first selects an initial paging sub-system for the outbound link, and if the central control unit does not receive a message on the inbound link at the selected time and carrier frequency, then the central control unit reinitiates the outbound message on a different paging sub-system.

12. A system as in claim 8 comprising multiple paging sub-systems, and wherein the central control unit maintains a data base indicating a last known position for the field unit, and the control unit selects an initial paging sub-system for the outbound link based upon the last known position for the field unit.

13. A system as in claim 8 wherein the control unit abandons further use of the selected inbound carrier frequency after transmission of the inbound message, to minimize interference with other communication systems which make use of that carrier frequency.

14. A method of operating a communications system to provide ubiquitous wireless data communication services between a message operations center (MOC) and a plurality of remote field units, by using a network of widely distributed radio base station (RBS) sites and multiple paging systems, the method comprising the steps of:

A. at a customer calling station, initiating a request to the MOC to communicate with a particular remote field unit, such as a request for the field unit to determine and report its location;

B. at the MOC site,
  i. polling the RBS sites to determine a radio frequency which is presently suitable for the field unit to send an inbound message back to one or more of the RBS sites;
  ii. determining an available frequency and a time for the field unit response;
  iii. formatting the time and frequency for the field unit response into an outbound page message;
  iv. forwarding the page message to at least one of the paging systems;

C. in at least one of the paging system sites, communicating the page message to the field units over the paging system;

D. at the selected field unit,
  i. receiving the page message;
  ii. formulating a response to the page message by reading data available locally to the field unit;
  iii. formulating a response as an inbound message back to the radio base stations;
  iv. encoding the response in the form of a short duration burst message, to minimize the probability of interfering with existing broadcast or other communications at frequencies near the selected frequency;

v. at the indicated carrier frequency and time, transmitting the inbound message over the air;

E. at the RBS site,
  i. receiving the inbound message from the field unit over the air; and
  ii. forwarding the inbound message back to the MOC;

F. at the MOC site, forwarding the inbound message back to the customer calling station; and G. at the calling station, receiving inbound message.

15. A method as in claim 14 wherein the calling stations are connected to the MOC through the land based public switched telephone network (PSTN).

16. A method as in claim 14 wherein the MOC is connected to the paging systems through the land based public switched telephone network (PSTN).

17. A method as in claim 14 wherein the MOC communicates with the RBSs over a land-based connection such as the public switched telephone network.

18. A method as in claim 14 wherein the MOC communicates with the RBSs over a land-based connection such as a leased private telephone circuits.

19. A method as in claim 14 additionally comprising the step of,
  at the MOC, alerting one or more of the associated RBSs to expect a response from the indicated field unit at the specified frequency and time.

20. A method as in claim 19 additionally comprising the step of, at the RBS, if no such message is received as alerted by the MOC, reporting an error to the MOC.

21. A method as in claim 20 additionally comprising the step of, at the MOC, upon receiving an error report from the RBS, sending the outbound page message using another one of the paging systems.

22. A method as in claim 14 wherein the step B.iv. additionally comprises the steps of, at the MOC,
  i. receiving reports of locations of the field units,
  ii. maintaining a database of last known locations for the field units in the system, and
  iii. determining the identity of a paging system which is closest in physical location to the last known location of the field unit, and attempting to send the outbound message using that nearest paging system first.

23. A method as in claim 14 wherein each RBS additionally performs the step of periodically measuring a receive power level in each possible inbound frequency channel.

24. A method as in claim 14, additionally comprising the step of, at the field unit, collect data to be reported including a latitude and longitude from a geolocation system.

25. A method as in claim 14 wherein the short duration inbound message is encoded using spread spectrum modulation.

26. A method as in claim 14 wherein the MOC communicates with the RBSs over a Very Small Aperture Terminal (VSAT) network.

* * * * *